United States Patent [19]

Grzywinski et al.

[11] 4,288,480
[45] Sep. 8, 1981

[54] PRESSURE SENSITIVE ADHESIVE COMPOSITION AND COATED PRODUCT

[75] Inventors: Gerald G. Grzywinski; Edward J. Foley, both of Gorham, Me.

[73] Assignee: Scott Paper Company, Philadelphia, Pa.

[21] Appl. No.: 38,393

[22] Filed: May 14, 1979

Related U.S. Application Data

[63] Continuation-in-part of Ser. No. 914,566, Jun. 12, 1978, abandoned.

[51] Int. Cl.³ .................... B32B 25/06; C08F 19/08
[52] U.S. Cl. ................... 428/40; 260/27 BB; 260/29.8; 260/33.6 AQ; 260/33.6 PQ; 428/335; 428/352; 428/354; 428/355; 428/511; 428/521; 428/914; 525/89; 525/99; 525/901
[58] Field of Search ............... 428/40, 343, 349, 352, 428/355, 335, 511, 521, 914; 525/99, 89, 901; 427/207; 260/27 BB, 28.5 B, 33.6 AQ, 29.8, 33.6 PQ

[56] References Cited

U.S. PATENT DOCUMENTS

| 2,560,031 | 7/1951 | Cline | 260/798 |
|---|---|---|---|
| 3,352,944 | 11/1967 | Wheat | 260/28.5 B |
| 3,932,328 | 1/1976 | Korpman | 428/355 |
| 3,954,692 | 5/1976 | Downey | 428/355 |
| 4,039,705 | 8/1977 | Dovek et al. | 428/40 |

Primary Examiner—Paul J. Thibodeau
Attorney, Agent, or Firm—R. Duke Vickrey; John W. Kane, Jr.

[57] ABSTRACT

Disclosed is an improved pressure-sensitive adhesive composition comprising an unvulcanized elastomer component comprising at least one block copolymer of styrene and either isoprene or butadiene with a polystyrene block on at least one end of the block copolymer, a tackifying resin component compatible with the elastomer component, a plasticizer component, and a modifier component of unvulcanized cis-1,4-polybutadiene. Also disclosed is the pressure-sensitive adhesive structure comprising a web of material, such as paper, upon which is coated a layer of the above-described composition.

5 Claims, No Drawings

PRESSURE SENSITIVE ADHESIVE COMPOSITION AND COATED PRODUCT

RELATED APPLICATION

This application is a Continuation-in-part of United States Application Ser. No. 914,566 for Pressure-Sensitive Adhesive Composition and Coated Product filed June 12, 1978 now abandoned.

TECHNICAL FIELD

This invention relates to an improved pressure-sensitive adhesive composition useful as a coating for such products as adhesive tapes and the like, and more specifically, to a pressure-sensitive adhesive composition which is aggressively tacky and maintains cohesive strength at temperatures of −10° F. or lower and also at room temperatures.

BACKGROUND ART

Pressure-sensitive adhesive compositions are widely used as the coating for adhesive tapes, labels, wall coverings, bumper stickers, etc. Typical compositions are prepared by blending tackifying resins with a variety of available elastomeric materials. Recent art describes pressure-sensitive adhesives based on elastomeric block copolymers of styrene and butadiene or isoprene. For example, U.S. Pat. No. 3,932,328 to Korpman discloses a pressure-sensitive adhesive composition of an A-B-A block copolymer and a tackifier component, where A is polystyrene and B is isoprene. U.S. Pat. No. 3,954,692 to Downey discloses a pressure-sensitive adhesive composition of polystyrene - polyisoprene - polystyrene block copolymer with a special tackifier resin chosen from a variety of resins including copolymers formed from 1,3-butadiene and aliphatic monoolefins. U.S. Pat. No. 3,519,585 to Miller discloses a pressure-sensitive adhesive mixture of two styrene-butadiene block copolymers with a tackifier resin. The block copolymer may contain cis -1,4 polybutadiene. Other examples of pressure-sensitive adhesive compositions can be found in U.S. Pat. Nos. 3,427,269; 3,917,607; 3,956,223; and 4,048,124.

The above described compositions are well established as useful pressure-sensitive adhesives. However, the physical properties of these block copolymer compositions preclude their use as viable cold temperature adhesives (specifically, an adhesive for tapes or labels which is aggressively tacky and cohesively strong at ambient temperatures as well as −10° F. or lower). With the present practices in the food business a pressure-sensitive adhesive tape or label which can be attached to a container (especially corrugated box board) at either cold temperature or ambient temperature is highly desirable. Block copolymer resin formulations can be sufficiently softened by plasticizer additions so as to be tacky at −10° F., but such compositions will then lack sufficient cohesive strength at ambient temperatures and cause difficulties in the preparation and storage of the tapes or labels.

DISCLOSURE OF INVENTION

It is an object of the invention to provide an improved pressure-sensitive adhesive which is aggressively tacky and cohesively strong both at ambient temperatures and at −10° F. or lower.

This and other objects are provided by the present invention which is a pressure-sensitive adhesive composition in which a mixture comprising:

A. 100 parts by weight of an unvulcanized elastomer component comprising at least one block copolymer of styrene and either isoprene or butadiene, with a polystyrene block on at least one end of the block copolymer;

B. about 100 to about 250 parts by weight of a tackifying resin component compatible with the elastomer component; and C. about 10 to about 75 parts by weight of a plasticizer component; is improved by the addition of:

D. about 2 to about 100 parts by weight of a modifier component of unvulcanized cis-1,4-polybutadiene.

The invention is also the pressure-sensitive adhesive structure comprising a web of material, such as paper, upon which is coated a layer of the above-described improved pressure-sensitive adhesive composition in a thickness of from 0.5 to 3 mils.

The invention is also a laminated sheet material for use as pressure-sensitive adhesive labels and the like comprising, in the following order, a paper base sheet, a layer of release material, a layer of the above-described improved pressure-sensitive adhesive composition, and a paper face sheet.

The adhesive composition of the present invention has the advantage of being capable of being applied to a web as a hot melt coating or from a solvent system. Most importantly, the invention surprisingly provides a pressure-sensitive adhesive composition which is aggressively tacky and cohesively strong at both cold temperatures and ambient temperatures.

Polybutadiene is known in the art as a component of rubber. For example, U.S. Pat. No. 2,560,031 to Cline discloses mixing a butadiene-styrene copolymer with an emulsion polymer of butadiene to increase the freeze resistance of vulcanized rubber composition. And U.S. Pat. No. 3,352,944 to Wheat discloses a mixture of butadiene-styrene rubber and cis-1,4-polybutadiene which provides improved finished properties for products such as passenger tires. However, such uses of polybutadiene involve vulcanization to provide the strength necessary for the types of products made (such as tires), and none of the uses suggests usefulness as a modifier in pressure-sensitive adhesives suitable for both cold temperatures and ambient temperatures uses.

BEST MODE FOR CARRYING OUT THE INVENTION

The following examples illustrate the advantages of the present invention.

EXAMPLE 1 (Prior Art)

The following materials were mixed together:

| Elastomer Component | total parts 100 |
|---|---|
| 1. Triblock copolymer at 13% styrene and 87% isoprene (by weight) with polystyrene blocks on both ends. mol. wt. 100,000 (Kraton 1107 from Shell Chemical Co.) | 60 parts by weight |
| 2. Radial teleblock copolymer of 15% styrene and 85% isoprene (by weight) with a polystyrene block on the outer end of each radial arm; mol. wt. 300,000 (Solprene 418 from Phillips Petroleum) | 20 parts by weight |
| 3. Radial teleblock copolymer of 20% styrene and 80% butadiene (by weight) with a polystyrene block on the outer end of each radial arm. mol. wt. 160,000 (Sol- | |

| | |
|---|---|
| prene 417 from Phillips Petroleum) | 20 parts by weight |
| Tackifying Resin Component | total parts - 175 |
| 1. Synthetic polyterprene, 100° C. softening point (Wingtack 95 from Goodyear Tire and Rubber Company) | 80 parts by weight |
| 2. Polymerized alkyl and aromatic olefins, 80° C., softening point (Super STA-TAC 80 from Reichhold Chemical Co.) | 20 parts by weight |
| 3. Liquid styrene, modified polystyrene copolymer (Piccolastic A-5 from Hercules) | 75 parts by weight |
| Plasticizer Component | total parts - 45 |
| 1. Liquid polybutene, mol. wt. 320 (Indopol L-14 from Amoco Chemicals Co. | 45 parts by weight |
| Antioxidant Component | total parts - 5 |
| 1. Modified high molecular weight hindered phenol (Agerite Geltrol from R. T. Vanderbilt) | 5 parts by weight |

The above components were mixed together to form an unvulcanized hot melt adhesive with a viscosity (melted) at 150° C.—of 9,200 cps. The adhesive was melted and poured onto a siliconized (silicone coated) release liner paper web and smoothed to a thickness of one mil by pulling a heated bar across the adhesive layer. A web of computer label paper stock was laminated to the adhesive coated release liner, and the laminate was air cooled.

EXAMPLE 2 (Prior Art)

A pressure-sensitive adhesive composition like that of Example 1 was prepared, except that:

Item 2. (Solprene 418) and item 3. (Solprene 417) of the Elastomer Component were replaced with 40 parts by weight of a linear triblock copolymer of 30% styrene and 70% butadiene (by weight) with polystyrene blocks on both ends, mol. wt. less than 100,000 (Kraton 1102 from Shell Chemical Co.); and The amount of the plasticer component was 20 parts by weight;

The components of Example 2 were mixed together to form an unvulcanized hot melt adhesive with a viscosity (melted) at 150° C. of 20,000 cps. The adhesive was applied to a release liner and laminated to computer label stock in the same manner as in Example 1.

EXAMPLE 3 (Invention)

The pressure-sensitive adhesive composition of Example 1 was prepared with the addition of the

| Modifier Component | total parts - 30 |
|---|---|
| 1. cis-1, 4-polybutadiene elastomer having molecular weight, characterized by Chuck Mooney viscosity ML-4 of 35-45 (Ameripol CB-220 from B. F. Goodrich) | 30 parts by weight |

The components of Example 3 were mixed together to form an unvulcanized holt melt adhesive with a viscosity (melted) at 150° C. of 43,000 cps. The adhesive was applied to a release liner and laminated to computer label stock in the same manner as in Example 1.

EXAMPLE 4 (Invention)

A pressure-sensitive adhesive composition like that of Example 3 was prepared except the amount of modifier component was 100 parts by weight and the adhesive composition was dissolved in toluene to form a 30% solution having a viscosity of 2,000 cps. The solution was applied to a release liner and laminated to a computer label stock in the same manner as in Examples 1-3, except it was applied cold and smoothed with a cold rod. The adhesive was then oven dried at 70° C. for 5 minutes.

EXAMPLE 5

The pressure-sensitive adhesive composition of Example 2 was prepared with the addition of the same modifier component employed in Examples 3 and 4, but in an amount of 1 part by weight. The components of Example 5 were mixed together to form an unvulcanized hot melt adhesive with a viscosity (melted) at 150° C. of 22,000 cps. The adhesive was applied to a release liner and laminated to computer label stock in the same manner as in Examples 1-3.

EXAMPLE 6 (Invention)

A pressure-sensitive adhesive composition like that of Example 5 was prepared except the amount of modifier component was 2 parts by weight. The adhesive was applied with a viscosity (melted) at 150° C. of 24,000 cps. to a release liner and laminated to computer label stock in the same manner as in Example 5.

EXAMPLE 7 (Invention)

A pressure-sensitive adhesive composition like that of Example 5 was prepared except the amount of modifier component was 5 parts by weight. The adhesive was applied with a viscosity (melted) at 150° C. of 30,000 cps. to a release liner and laminated to computer label stock in the same manner as in Example 5.

All seven examples were tested to determine their ability to function at ambient temperature and as a viable cold temperature adhesive. Test strips one inch wide and four inches long were cut from the laminates and the release liner removed. The adhesive coated strips were then applied to the outer surface of corrugated box board (to simulate their most likely actual use) at a test temperature of 70° F. and at a test temperature of −10° F. The strips were pressed onto the box board with a 4½ lb. roller and left for one hour before removing. Before being applied, the strips and the box board were conditioned to the test temperature. After removing by stripping, each adhesive strip was examined to determine the amount of paper fibers which pulled from the box board and stuck to the adhesive (measured by the portion of the adhesive area which was covered with fibers). About 5% or more fiber coverage indicated that the adhesive was suitable for its intended use and coverage of 20% was considered to be outstanding. Another test performed on the test samples was the 180° peel strength test from a stainless steel surface at 70° F., in accordance with PSTC-1 of the Pressure Sensitive Tape Council.

The following results were obtained from the tests:

| | Example No. | | | | | | |
|---|---|---|---|---|---|---|---|
| | 1 | 2 | 3 | 4 | 5 | 6 | 7 |
| Fiber Pick at 70° F. | 0% | 10% | 10% | 5% | 10% | 10% | 25% |
| Fiber Pick at −10° F. | 0% | 2% | 10% | 20% | 2% | 10% | 10% |
| 180° peel - | 18 | 24 | 18 | 14 | 22 | 21 | 22 |

|  | Example No. | | | | | | |
|---|---|---|---|---|---|---|---|
|  | 1 | 2 | 3 | 4 | 5 | 6 | 7 |
| PSTC-1 (oz/in) | | | | | | | |

From the foregoing test results it can be seen that the unmodified adhesive composition of the prior art (Examples 1 and 2) performed well on the standard 180° peel test, but can be seen by the Fiber Pick tests to be unsuitable for use on corrugated box board at low temperature. It can also be seen that the modified adhesive composition of the invention (Examples 3, 4, 6, and 7) not only performed well on the standard 180° peel test, but were found to be suitable for use on box board at 70° F. as well as at −10° F. by the Fiber Pick tests.

From these tests and others, it is believed that the amount of modifier component useful in the invention is between about 2 parts and about 100 parts per 100 parts of the elastomer (block copolymer) component.

The preferred embodiments of the invention having been described in detail, variations within the scope and spirit of the invention will be obvious to those skilled in the art. For example, a variety of different block copolymer elastomer components can be employed, alone or mixed together, as long as they are formed from blocks of polystyrene and blocks of either polyisoprene or polybutadiene. Examples of such block copolymers are diblocks (where each molecule is formed by a block of polystyrene on one end and a block of either polyisoprene or polybutadiene on the other end), tri-blocks (where each molecule is formed by a block of polystyrene on each end and a block of polyisoprene or polybutadiene in the center), and star copolymers or radial teleblock copolymers (where each molecule has a plurality of radial arms extending from a nucleus with a block of polystyrene on the end of each arm and a block of either polyisoprene or polybutadiene on each arm between the polystyrene and the nucleus). Mixtures of the same form of block copolymers, but with different block proportions, can also be mixed. The mixtures, if used, will be dictated by particular properties of available component which mixed together provide the desired properties of the invention. Preferably, the polystyrene part of the component will be a minor percentage, from about 10% to about 40%, by weight, for example.

The above-described tackifying resin component is a mixture of resins which are well known in the art as useful for blending with the particular elastomer component chosen. Other resins, such as glycerol or pentaerythritol esters of stabilized rosin resin acids and others identified in the above-listed patents, can also be used. However, it is important that they be compatible with the elastomer component.

A variety of plasticizers can be substituted for the one named, and their choices are well known to those skilled in the art. They are normally liquid oils which soften the elastomer component. Examples can be found identified in the above-listed patents.

The antioxidant component of the example was added to increase stability of the adhesive over a long period of time. The antioxidant component is not necessary to the invention, but is desirable for obvious reasons. Again, a variety of materials are known in the art for performing this function.

The web of sheet material in the pressure-sensitive adhesive structure of the invention is preferably provided by paper, which is preferably coated to enable it to be printed upon or decorated. However, it can also be provided by other sheet materials useful for tapes, labels and the like, such as plastic sheets or thin metal foils.

The laminated sheet material of the invention includes a paper base sheet suitable for use as a release liner, such as a densified Kraft paper, and a layer of any of the conventional release materials, such as the silicone resins commonly used for release purpose. The face sheet can be any conventional cellulosic sheet capable of being printed or decorated, and it may be coated with various conventional coating compositions, such as printing paper coatings or photo-sensitive coatings such as zinc oxide compositions.

What is claimed is:

1. A pressure-sensitive adhesive composition comprising a mixture of:
    A. 100 parts by weight of an unvulcanized elastomer component comprising at least one block copolymer of styrene and either isoprene or butadiene, with a polystyrene block on at least one end of the block copolymer;
    B. about 100 to about 250 parts by weight of a tackifying resin component compatible with the elastomer component;
    C. about 10 to about 75 parts by weight of a plasticizer component; and
    D. about 2 to about 100 parts by weight of a modifier component consisting essentially of unvulcanized cis-1,4-polybutadiene.

2. The pressure-sensitive adhesive composition according to claim 1, wherein the elastomer component is provided by a mixture of different block copolymers of styrene and either isoprene or butadiene, each of which has a polystyrene block on at least one end of the block copolymer.

3. The pressure-sensitive adhesive composition according to claim 1, wherein the amount of polystyrene in the elastomer component is from about 10% to about 40%, by weight, of the elastomer component.

4. A pressure-sensitive adhesive structure comprising a web of sheet material having coated on at least one side a layer of the composition of claim 1 in a thickness of from 0.5 mils to 3 mils.

5. A laminated sheet material for use as pressure-sensitive adhesive labels and the like comprising, in the following order, a paper base sheet, a layer of release material, a layer of the pressure-sensitive adhesive composition according to claim 1, and a paper face sheet.

* * * * *